United States Patent [19]

Rocco

[11] 4,352,647
[45] Oct. 5, 1982

[54] INSULATED TIRE PRESS BAG WELL AND A METHOD THEREFOR

[76] Inventor: Harold S. Rocco, 4271 Darrow Rd., Stow, Ohio 44224

[21] Appl. No.: 218,113

[22] Filed: Dec. 19, 1980

[51] Int. Cl.³ .......................... B29H 5/02; B29H 5/08
[52] U.S. Cl. ........................................ 425/48; 249/65; 249/111; 249/205; 264/45.2; 264/46.9; 264/326; 425/38; 425/186; 425/DIG. 19
[58] Field of Search ................ 425/33, 34, 34 A, 40, 425/48, 35, 36, 58, 43, 42, 49, 50, 51, 52, 38, DIG. 19, 186; 264/45.2, 46.5, 46.9, 326; 249/65, 111, 205

[56] References Cited

U.S. PATENT DOCUMENTS

| | | | |
|---|---|---|---|
| Re. 27,513 | 10/1972 | Pacciarini et al. | 425/38 X |
| 1,588,668 | 6/1926 | Fairchild | 425/40 |
| 1,871,620 | 8/1932 | Kraft | 425/40 |
| 2,174,590 | 10/1939 | Meier | 425/40 |
| 2,266,956 | 12/1941 | Brundage | 425/40 X |
| 2,358,762 | 9/1944 | Soderquist | 425/40 X |
| 2,358,764 | 9/1944 | Soderquist | 425/34 R |
| 2,854,693 | 10/1958 | Robbins | 425/42 X |
| 2,858,566 | 11/1958 | Brundage | 425/33 |
| 3,097,394 | 7/1963 | Mallory et al. | 264/326 X |
| 3,313,020 | 4/1967 | Krauskopf | 264/46.9 X |
| 3,378,882 | 4/1968 | Turk et al. | 425/43 X |
| 3,465,385 | 9/1969 | Zängl | 264/326 X |
| 3,640,653 | 2/1972 | Laenen et al. | 425/33 |
| 3,668,287 | 6/1972 | Mackie | 264/45.2 |
| 3,837,770 | 9/1974 | Gazuit | 425/52 X |
| 3,988,077 | 10/1976 | Naratov et al. | 425/58 X |
| 4,035,117 | 7/1977 | Nakagawa et al. | 425/38 X |
| 4,120,193 | 10/1978 | Tomsic et al. | 425/33 X |

Primary Examiner—Philip E. Anderson
Attorney, Agent, or Firm—Oldham, Oldham, Hudak & Weber Co.

[57] ABSTRACT

A tire press bag well is insulated with at least one envelope. The envelope extends substantially around the bag well within the bag well housing and can be inflated. The envelope, in addition to its insulating properties, can have insulation thereon and the ends of the envelope can be fastened to itself. The configuration of the envelope, once installed, desirably conforms to the shape of the bag well housing. Since heat is applied to a tire press via the bag well, insulation thereof considerably reduces heat loss as well as reduces cure time.

30 Claims, 4 Drawing Figures

INSULATED TIRE PRESS BAG WELL AND A METHOD THEREFOR

TECHNICAL FIELD

The present invention relates to the insulation of a tire press bag well utilizing an inflatable envelope and to a method therefor.

BACKGROUND ART

Heretofore, the bag wells of tire presses have generally been uninsulated, thus resulting in large losses of heat. Occasionally, in order to prevent heat loss, fiberglass insulation has been installed by hand through the narrow housing apertures. However, such is a makeshift attempt at best in that only a small portion of the bag well area was insulated, with the sides and back area of the bag well with respect to the aperture openings being uninsulated.

In order to fully insulate a bag well, the tire press operation had to be closed down, the entire bag well housing removed, insulation as in the form of fiberglass, etc., installed about the bag well, and the bag well housing reapplied. Not only was this operation time consuming, but also costly due to the close down time of the press.

U.S. Pat. No. 1,871,620 to Kraft merely relates to an insulated plate or layer along one portion of a vulcanizing cavity.

Similarly, Brundage (U.S. Pat. No. 2,266,956) contains insulating layer 27 which is mounted along one side of a vulcanizing area.

U.S. Pat. Nos. 2,358,764 and 2,358,762 to Soderquist relate to insulating the upper areas of a tire press, and not to any bag well area.

U.S. Pat. No. 3,640,653 to Laenen et al places insulation about the vulcanization chamber, particularly between the platen 9 and top plate 10 of the base. As apparent from various drawings and especially FIG. 10, it is apparent that the steam which is introduced into the air bladder comes from a remote source and is introduced into the bladder which is inflated upon introduction thereof. Once more, there is no suggestion of insulation other than the vulcanization cavity portion.

None of the above disclosures relate to the utilization or structure of an envelope which is inserted during operation of the tire press into the narrow bag well housing openings about the bag well, and inflated to create an insulation area solely about the bag well.

DISCLOSURE OF INVENTION

It is therefore an object of the present invention to provide a tire press bag well area which has been insulated.

It is yet another object of the present invention to provide an insulated bag well area, as above, wherein an envelope is utilized.

It is yet another object of the present invention to provide an insulated bag well area, as above, in which said envelope is inflatable.

It is yet another object of the present invention to provide an insulated bag well area, as above, in which a portion or the entire envelope is covered with an insulated material.

It is yet another object of the present invention to provide an insulated bag well area, as above, in which said envelope resides in said bag well area adjacent and contiguous to the bag well housing.

It is yet another object of the present invention to provide an insulated bag well area, as above, wherein a gap exists between said envelope and said bag well.

It is yet another object of the present invention to provide an insulated bag well area, as above, wherein said envelope can be made out of rubber, and the like.

It is another object of the present invention to provide an insulated bag well area, as above, in which one end of the envelope is attached to the other end of the envelope.

It is yet another object of the present invention to provide an insulated bag well area, as above, in which a plurality of said envelopes are utilized.

It is yet another object of the present invention to provide an insulated bag well area, as above, wherein a process utilizes an envelope as set forth above, wherein said envelope is inserted through a bag well housing opening and about said bag well.

It is yet another object of the present invention to provide an insulated bag well area, as above, wherein said process utilizes a plurality of said envelopes.

It is yet another object of the present invention to provide an insulated bag well area, as above, wherein said process the envelope is positioned adjacent to said bag well housing such that the gap exists between the envelope and the actual bag well itself.

It is yet another object of the present invention to provide an insulated bag well area, as above, wherein said process said envelope is inflatable.

It is yet another object of the present invention to provide an insulated bag well area, as above, wherein said process the ends of said envelope are secured to one another.

These and other objects of the present invention will become apparent from the invention which is described herein in detail.

In general, an insulated bag well of a tire press, comprises: a bag well for a tire curing press; a housing, said housing located about said bag well and spaced therefrom; at least one envelope, said envelope located between said bag well and said housing and insulating said bag well.

In general, a process for insulating a bag well for a tire press, comprises the steps of: inserting at least one envelope into the space located between the bag well and the bag well housing; and positioning said envelopes substantially about said bag well.

BEST MODE FOR CARRYING OUT THE INVENTION

Figure 1:
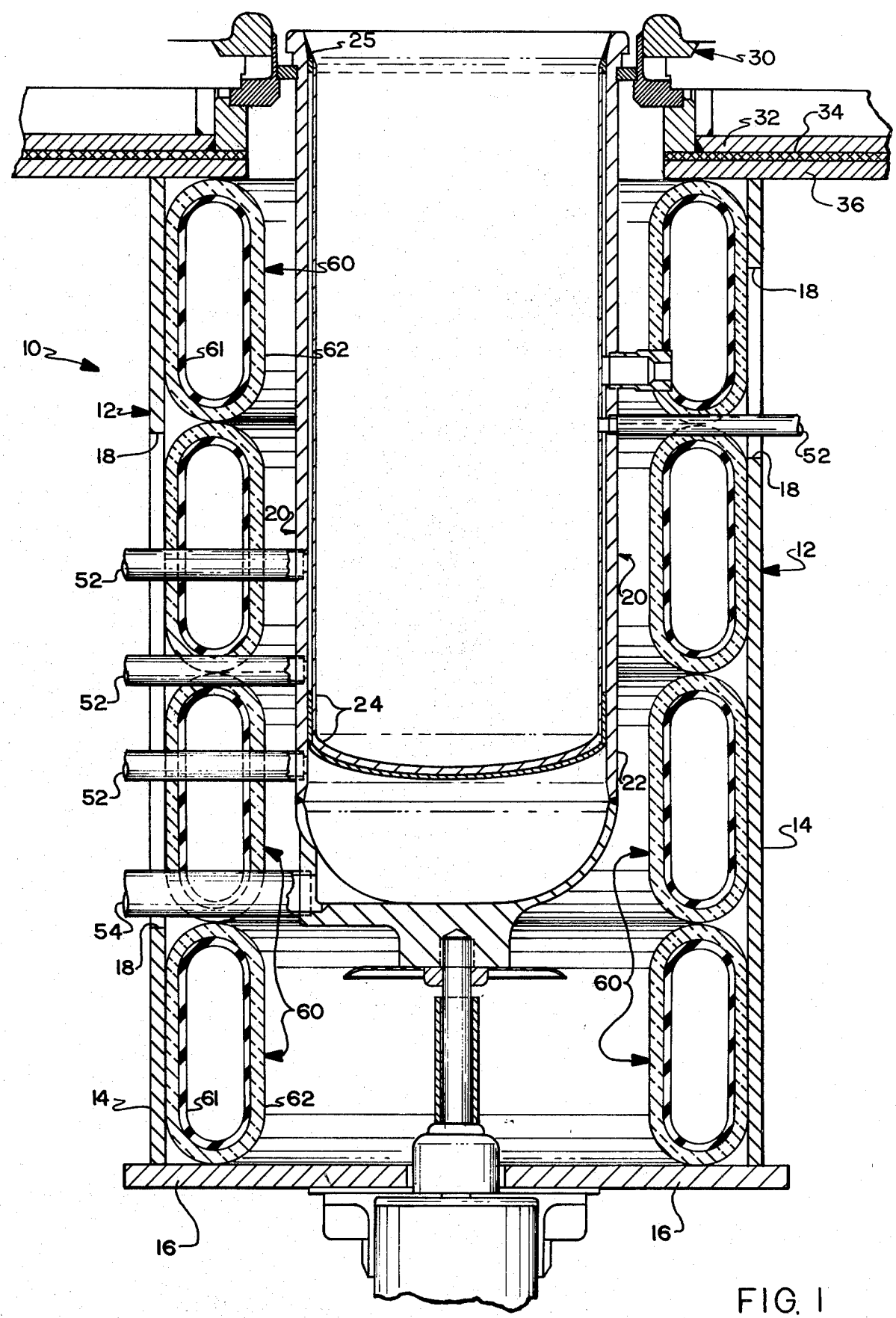
FIG. 1 is a cross-sectional view showing a bag well, a bag well housing, and insulating envelopes of the present invention.

Referring to FIG. 1, the basic structural elements of the bottom portion of a tire press containing the bag well are shown and is generally indicated by the numeral 10. The bag well housing and support structure is generally indicated by the numeral 12. The bag well housing has side walls 14 and bottom wall 16.

The bag well, which contains a bag therein, is generally indicated by the numeral 20. Bag well 20 as well as the bag well housing 12 is connected to the bottom of a tire vulcanizing section, generally noted by the number 30. Only the lowermost portion of the tire vulcanizing section is shown. The tire vulcanizing section may be any conventional tire press known to the art, e.g., a tire press manufactured by the N.R.M. Co. The tire vulcanizing section contains a platen 32, insulation layer 34, and plate 36. It is noted that insulation 34 only insulates the tire curing or vulcanization section as noted by the prior art patents and discussed hereinabove.

Bag well 20 is utilized to inject heat therein and, through bag 24, is lifted upwards and then laterally into tire vulcanizing section 30 where it bears against the inside of a tire (not shown) and applies heat thereto so that the tire is cured. Bag 24, which may be any conventional curing bag, is made out of a conventional material such as natural rubber and/or butyl rubber, and is generally clamped to bag well 20 at the upper portion thereof as at connection point 25.

The heat applied to bag well 20 may be in any conventional form as hot air, a hot gas, hot water, and the like, with steam generally being utilized. The steam is applied through inlet ports or pipes 52. Naturally, when applied, the steam will force bag 24 upwardly and then laterally into the torroid tire shape of the tire which is contained in vulcanizing cavity 30. Condensation from the steam is removed through drain pipe 54.

As seen in FIG. 1, in the vicinity of inlet pipes 52 and drain pipe 54 generally exists one or more apertures, the sidewalls of which are indicated by the number 18. Heretofore, the area or space between bag well housing 12 and bag well 20 generally was not insulated so that heat would be lost throughout the apertures 18 as well as bag well housing 12.

Figure 2:
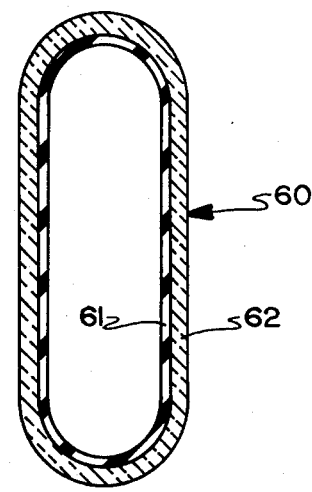
FIG. 2 is a cross-sectional view of the insulating envelope.

According to the concepts of the present invention, the bag well area of the tire curing press is insulated through the use of envelopes, generally indicated by the numeral 60. The envelopes are made out of a flexible material and preferably can be inflated as by using air, etc. Suitable materials include a cured yet flexible rubber, a urethane type rubber, and the like. As shown in FIG. 2, the envelope 61 is preferably insulated with insulating material 62. Insulating material 62 can generally be any material which is flexible and yet provides insulation. Specific examples include fiberglass, woven fiberglass, and the like. The thickness can vary as desired, as from about 0.25 to about 2.0 inches, with approximately 1.25 inches being preferred.

Generally, the shape and size of the envelope can be any shape such that it can be inserted through apertures 18 into the space between bag well housing 12 and bag well 20 and inflated, thereby providing an insulating layer of air between the envelope and the housing. The insulation 62 upon one side of the envelope, or both, or upon the entire envelope, provides still further insulation. That is, the side towards bag well 20, or the other side towards housing 12, may one or both be insulated, as may the entire envelope, as shown.

Figure 3:
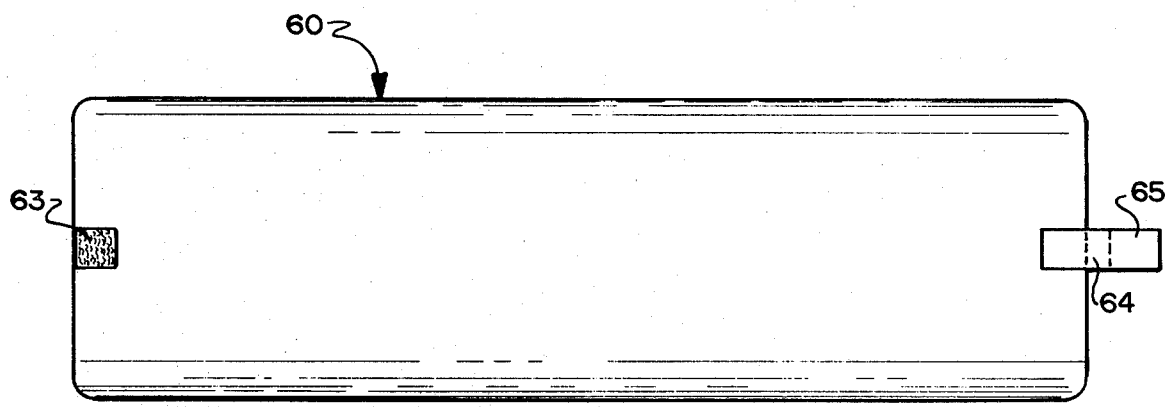
FIG. 3 is a plan view of the insulating envelope shown in an enlongated position.

Envelope 60 is preferably inflated to create a separately contained air pocket which serves to insulate the bag well. Normally, the air pressure is such to cause the envelope to be fully inflated. A desired cross-sectional shape of envelope 60 when inflated is shown in FIG. 2 as well as FIG. 1. Such a shape is generally elliptical or retangular such that a thickness of air exists within the envelope between bag well 20 and housing 18. Naturally, many other shapes may be utilized. As shown in FIG. 3, envelope 60 generally extends for a distance. Preferably, the distance is such that it can, when inserted and inflated, extend within the space or void between the bag well and the housing substantially about the bag well and preferably extend totally about the bag well such that the ends thereof contact one another to provide maximum insulation protection. Furthermore, the envelope may be molded or constructed such that the inner diameter thereof is greater than the outer diameter of bag well 20. Thus, as shown in FIG. 1, when installed, another pocket of air (between envelope 60 and bag well 20) will be created. Moreover, envelope 60 or insulation 62 thereon does not directly contact the hot bag well.

Any number of envelopes may be utilized to generally seal off and insulate an entire bag well area, as shown. Accordingly, the number of envelopes may vary over any appropriate range, with generally from 2 to about 4 or 5 envelopes being utilized. Desirably, the envelopes bear against each other as shown in FIG. 1 so that the housing 14 is completely sealed.

Figure 4:
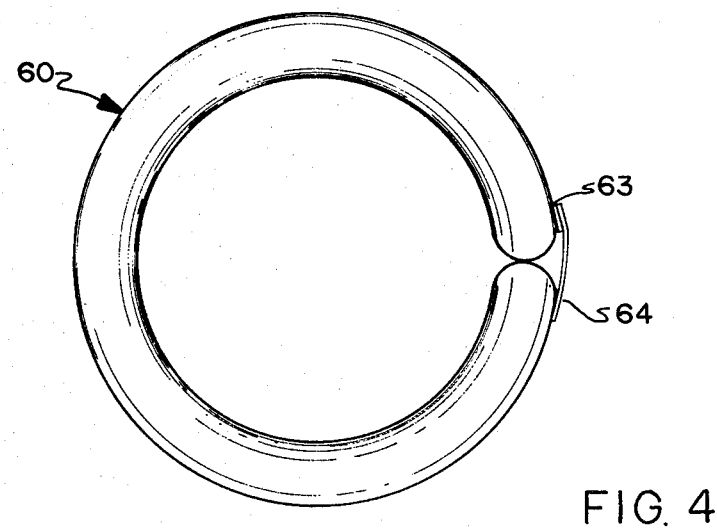
FIG. 4 is an elevational view of the envelope shown attached to itself.

In order to secure the ends of the envelope to each other, any suitable fastening means may be utilized. For example, as shown in FIGS. 3 or 4, one end of the envelope may contain a Velcro base 63 with the other end containing tabs 64 having a Velcro portion 65 thereon. Thus, as shown in FIG. 4, when installed about the bag well, the tab may be secured to Velcro base 63 to form an annular insulating envelope about the bag well.

As apparent from the above description, the envelopes can completely insulate the bag well from between top plate 36 and bottom wall 16 by generally bearing against or in contiguous relationship with housing side wall 12 and yet does still provide further insulating capacity by leaving an air space of insulating air between the envelopes and the bag well. Once installed, envelope 60 may remain within the bag well housing for an indefinite length of time. Additionally, once installed, envelope 60 may be inflated with any type of insulating foam material such as urethane foam, and the like, to further better insulate the bag well. Regardless of the specific configuration of the envelopes, the number thereof, insulating material thereon or therein, the net result is a much better insulated bag well housing having a greatly reduced amount of heat loss. Another benefit is that due to a reduction of heat loss, the tires will actually vulcanize and cure quicker.

While in accordance with the patent statutes, the best mode and preferred embodiments of the invention have been described in detail, it is to be understood that the invention is not limited thereto. Consequently, for an appreciation of the true scope and breadth of the invention, reference should be had to the appended claims.

What is claimed is:

1. An insulated bag well of a tire press, comprising:
    a bag well for a tire curing press,
    a housing, said housing located about said bag well and spaced therefrom,
    at least one envelope, said envelope located between said bag well and said housing and insulating said bag well.
2. An insulated bag well according to claim 1, wherein said envelope is inflated with air.

3. An insulated bag well according to claim 2, wherein said envelope extends substantially about said bag well.

4. An insulated bag well according to claim 3, wherein said envelope is contiguous with said housing.

5. An insulated bag well according to claim 4, wherein an air space exists between said bag well and said inflated envelope.

6. An insulated bag well according to claim 5, wherein said envelope extends completely about said bag well.

7. An insulated bag well according to claim 6, wherein the ends of said envelope are attached to each other.

8. An insulated bag well according to claim 3, including a plurality of said envelopes, said envelopes extending along the entire height of said bag well.

9. An insulated bag well according to claim 6, including a plurality of said envelopes, said envelopes extending along the entire height of said bag well.

10. An insulated bag well of a tire press, comprising:
a bag well for a tire curing press,
a housing, said housing located about said bag well and spaced therefrom,
at least one envelope, said envelope located between said bag well and said housing and insulating said bag well, said envelope possessing an insulating material.

11. An insulated bag well according to claim 10, wherein said envelope is inflated with air.

12. An insulated bag well according to claim 11, wherein said envelope extends substantially about said bag well and wherein said envelope is contiguous with said housing.

13. An insulated bag well according to claim 12, wherein an air space exists between said bag well and said inflated envelope.

14. An insulated bag well according to claim 13, wherein the ends of said envelope are attached to each other.

15. An insulated bag well according to claim 12, including a plurality of said envelopes, said envelopes extending along the entire height of said bag well.

16. An insulated bag well according to claim 10, 12, 13, 14 or 15, wherein said insulating material is located on one side of said envelope, said side being between said envelope and said bag well.

17. An insulated bag well according to claim 16, wherein said insulating material is located on one side of said envelope, said side being between said envelope and said housing.

18. An insulated bag well according to claim 16, wherein said insulating material is located in said envelope.

19. A process for insulating a bag well for a tire press, comprising the steps of:
inserting at least one envelope into the space located between the bag well and the bag well housing, and positioning said envelope substantially about said bag well.

20. A process according to claim 19, including inflating said envelope with air after said envelope is inserted into said bag well space.

21. A process according to claim 20, including locating said envelope contiguously with said housing.

22. A process according to claim 21, including fastening one end of said envelope to the other end.

23. A process according to claim 22, including installing a plurality of said envelopes about said bag well along the entire height of said bag well.

24. A process for insulating a bag well for a tire press, comprising the steps of:
inserting at least one envelope possessing insulating material into the space located between the bag well and the bag well housing, and positioning said envelope substantially about said bag well.

25. A process according to claim 24, including inflating said envelope with air after said envelope has been inserted into said bag well space, said envelope being contiguous with said housing.

26. A process according to claim 25, including fastening one end of said envelope to the other end.

27. A process according to claim 26, including installing a plurality of said envelopes about said bag well along the entire height of said bag well.

28. A process according to claim 24, 25, 26, or 27, wherein said envelope possesses said insulation on one side thereof, said side being between said envelope and said bag well.

29. A process according to claim 24, 25, 26 or 27, wherein said envelope possesses insulation on one side thereof, said side being located between said envelope and said housing.

30. A process according to claim 24, 25, 26, or 27, wherein said envelope is inflated with said insulation material.

* * * * *